United States Patent
Lau

(10) Patent No.: US 6,867,519 B2
(45) Date of Patent: Mar. 15, 2005

(54) ELECTRIC MOTOR

(75) Inventor: James Ching Sik Lau, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 205 days.

(21) Appl. No.: 10/277,803

(22) Filed: Oct. 23, 2002

(65) Prior Publication Data

US 2003/0102743 A1 Jun. 5, 2003

(30) Foreign Application Priority Data

Oct. 23, 2001 (GB) .............................................. 0125400

(51) Int. Cl.$^7$ ................................................. H02K 5/16
(52) U.S. Cl. ......................... 310/90; 310/91; 384/279; 384/297
(58) Field of Search ........................... 310/90, 91, 261, 310/40 MM; 384/279, 297

(56) References Cited

U.S. PATENT DOCUMENTS

| | | | | |
|---|---|---|---|---|
| 4,152,614 A | * | 5/1979 | Noguchi et al. | 310/233 |
| 4,409,505 A | * | 10/1983 | Petersen | 310/90 |
| 4,533,260 A | * | 8/1985 | Andrieux | 384/206 |
| 5,645,355 A | | 7/1997 | Tokushima et al. | 384/133 |
| 5,899,572 A | * | 5/1999 | Strobl | 384/279 |
| 6,023,114 A | | 2/2000 | Mori et al. | 310/90 |
| 6,342,739 B1 | * | 1/2002 | Furuya et al. | 310/40 MM |

FOREIGN PATENT DOCUMENTS

| | | | |
|---|---|---|---|
| DE | 3140017 A1 | * 4/1983 | ........... F16C/17/04 |
| DE | 39 18 844 A1 | 12/1990 | |
| GB | 2 354 291 A | 9/1999 | |
| JP | 9-264326 A | 7/1997 | |

OTHER PUBLICATIONS

Patent Abstract of Japan, vol. 1998, No. 02, Jan. 30, 1998, for Publication No. 09264236.

* cited by examiner

Primary Examiner—Dang Le
Assistant Examiner—Leda Pham
(74) Attorney, Agent, or Firm—Birch, Stewart, Kolasch & Birch, LLP

(57) ABSTRACT

An electric motor has a stator and a rotor. The rotor is supported by a sintered bearing associated with the stator. The bearing 10 co-operates with an abutment 18 on the rotor to form a thrust interface. The abutment has a planar surface 19 with an outer diameter A. The bearing 10 has a cylindrical radially outer surface, a central bore 13 with a diameter B and two end faces 12. One end face has an axially inclined thrust surface 16 having an inner edge with a diameter C and an outer edge with a diameter D wherein C<A<D and B≦C≦1.5B.

12 Claims, 2 Drawing Sheets

ELECTRIC MOTOR

This invention relates to an electric motor and in particular to a thrust bearing interface in a miniature electric motor.

Miniature electric motors commonly use oil impregnated sintered bushings for the bearings because they are very economical. The bearings primary function is to support a rotor shaft. They can also function as a thrust bearing by confronting an abutment on the rotor. The abutment is often provided by a fiber washer or similar low friction material supported axially by a step in the form of a spacer or collar fixed to the shaft or a change in diameter of the shaft, thereby limiting axial movement of the rotor. In some applications, the washer is not used, with the spacer directly contacting the end face of the bearing. The bearing and the abutment are designed to make surface contact with each other.

However, when the bearing and the abutment are misaligned so that the faces are not parallel, we find that the edge of the abutment contacts the bearing face and gouges a hole or groove in the face of the bearing. This causes significant friction between the two parts, reducing the useful power output of the motor. As these motors are very small, the power loss may be significant and has been known to prevent further operation of the motor. The misalignment may need be only 1 or 2 degrees to cause problems. The misalignment may be due to improper fitting of the bearing or the abutment or due to assembly and manufacturing tolerances. These causes may lead to misalignments of 5 degrees or more, if not carefully controlled.

It is known from JP 9-264326 to provide a bearing with a thrust face which has a single triangular ridge forming an initial line contact with the abutment on the shaft. This initial line contact is designed to wear quickly to form an annular contact surface. This is done to improve bedding in of the thrust surface but does not compensate for misalignment between the bearing and the shaft and/or abutment.

Accordingly, there is a need for a thrust bearing surface which accommodates normal assembly misalignment.

Accordingly, in one aspect thereof, the present invention provides a miniature electric motor having: a stator; a rotor having a shaft and an abutment surface with an outer diameter A; and an oil impregnated sintered bearing fixed with respect to the stator and supporting the rotor, the bearing having a cylindrical outer surface, a central bore defining an inner surface with a diameter B, and first and second end faces, the first end face having a thrust surface co-operating with the abutment surface to form a thrust interface between the rotor and the stator; wherein the thrust surface is axially inclined having an inner edge with a diameter C, an outer edge with a diameter D and an axial separation H between the inner and outer edges, and wherein C<A<D and B≦C≦1.5B.

One preferred embodiment of the invention will now be described, by way of example only, in which.

DETAILED DESCRIPTION OF THE PREFERRED EMBODIMENT

Figure 1:
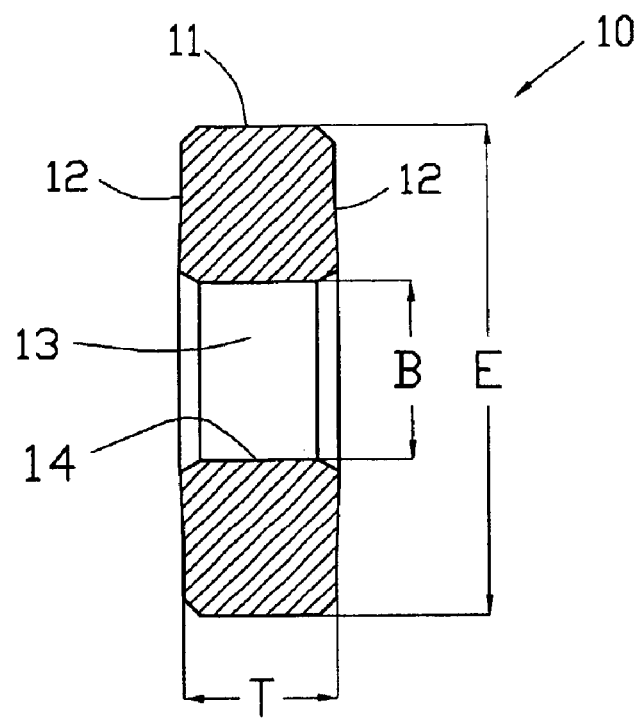
FIG. 1 is a side view of a bearing according to the preferred embodiment.
Figure 2:
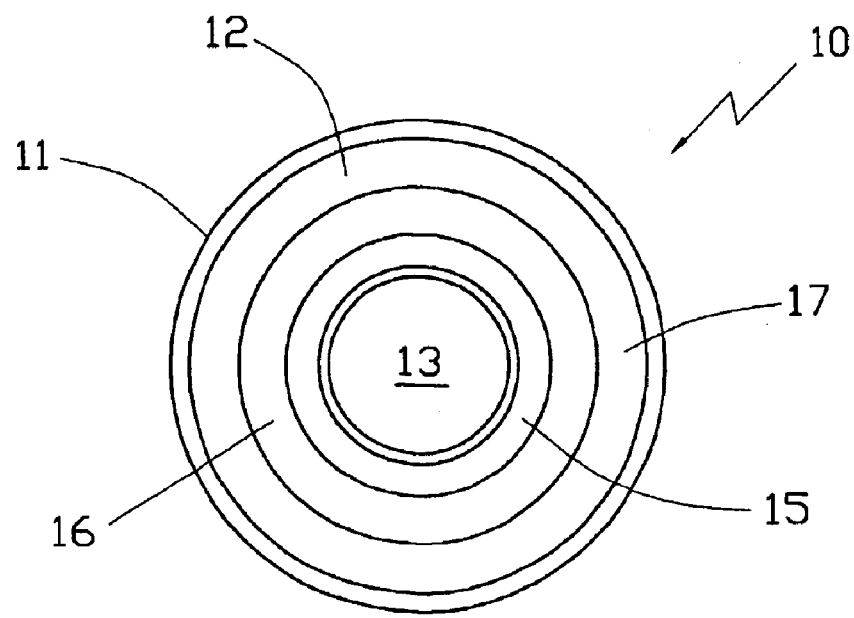
FIG. 2 is a plan view of the bearing of FIG. 1.

The bearing 10 of the preferred embodiment is shown in FIGS. 1 and 2. The bearing 10 is an oil impregnated sintered bronze bushing for use in a miniature electric motor. Although the size is not critical as the size of the bearing will vary depending on the application and the size of the motor in which it is to be used, it is helpful to realize that a typical bearing may have an outside diameter (E) of 5.5 mm and an internal diameter (B) of 2.0 mm and a width or thickness (T) of 1.7 mm.

The bearing 10 has a cylindrical radially outer surface 11, two axial end faces 12 and a central bore 13 extending co-axially with an axis of the bearing, the bore 13 being defined by a radially inner surface which is also known as the bearing surface 14. The end faces 12 are identical to allow the bearing to be used in either orientation. As shown exaggerated in FIG. 3, each end face 12 has two concentric but axially spaced planar portions 15, 17 joined by an intermediate surface 16 which is axially inclined. The intermediate surface 16 is inclined to a transverse plane by an angle of 2.5° i.e., it is inclined to the axis at an angle of 87.5°. The axial separation (H) between the outer portion and the inner portion is 0.1 mm so that the bearing is thicker between the inner portions 15 than between the outer portions 17 of the end faces 12. The radial extent of the inner portion 15 is 0.25 mm giving a diameter of 2.5 mm for a bore diameter of 2.0 mm.

Figure 3:
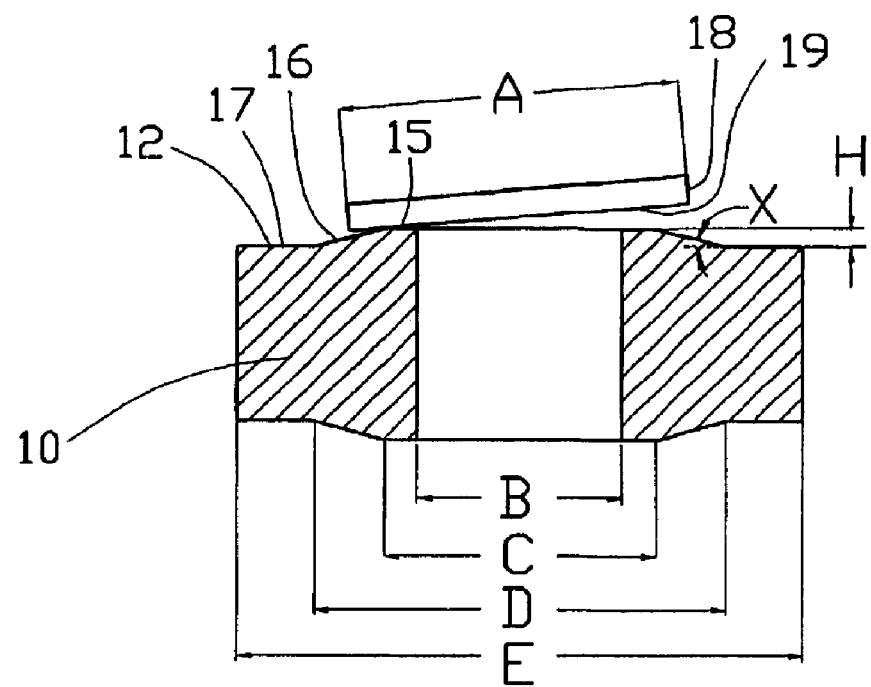
FIG. 3 is a detailed schematic explaining the operation of the bearing.

FIG. 3 schematically illustrates the interface between the thrust surface or end face of the bearing and the abutment of the rotor. In this instance, the misalignment has been exaggerated to more clearly explain the concept. Due to imperfect assembly, the bearing 10 and the rotor abutment surface 19 are misaligned, typically due to bearing misalignment or shaft misalignment, by a few degrees. The abutment 18 presents a planar abutment surface 19 to the bearing 10 but due to the misalignment, the abutment surface 19 makes point contact with the leading edge or radially inner edge of the intermediate portion 16 of the end face 12. Thus the friction between the bearing and the abutment is kept minimal by the reduced surface contact. If the bearing is misaligned with the shaft, the abutment 18 will rub the thrust surface at one spot only, setting up a stationary oil film. If the abutment is misaligned on the shaft, then the abutment surface 19 will rub the bearing in a ring as the rotor turns, reducing wear at any one spot on the bearing.

To prevent the abutment 18 from gouging a groove in the planar portions of the bearing end face 12, the abutment 18 must have an outer diameter A which is greater than the diameter C of the inner edge of the intermediate portion 16 and less than the diameter D of the outer edge of the intermediate portion 16, i.e. C<A<D.

Although it is desirable for the angle of the intermediate portion 16 to be greater than the angle of misalignment between the bearing 10 and the abutment surface 19 so as to make contact at the radially inner edge of the intermediate portion 16, satisfactory results can still be obtained when the misalignment is greater causing the outer edge of the abutment 18 to contact the intermediate portion 16. This will result in high contact friction but it will be less than that which would occur if the end face 12 of the bearing was flat. As such, the angle X, the angle of the intermediate portion 16 to a radial plane of the bearing, is ideally slightly larger than the average expected or maximum expected misalignment between the bearing 10 and the rotor abutment surface 19. This varies depending on assembly capability, manufacturing tolerances and motor size, etc. For a typical small motor, this may be as high as 10° but often less, say about 2° to 3°. Therefore, X would likely be between 1° and 10°, i.e., 1°≦X≦10° but preferably about 2.5°.

Although the preferred embodiment has two planar portions joined by the intermediate thrust surface, good results can still be obtained by eliminating either one or both planar surfaces. The desirability of having either planar surface will depend on the application, size of the bearing and the assembly method used. Also, the use of a bearing with identical or differing end faces will depend on designer's preference. As such the inner edge of the intermediate thrust surface 16 may have a diameter C which is equal to or greater than a diameter B of the bearing surface bore (i.e., zero inner planar surface) but less than or equal to about 1.5 times the diameter B.

Generally, the smaller the diameter C, the better and very favorable results have been obtained with diameter C being in the range of 1.1 to 1.3B. In practice, due to the desirability of a small lead in chamfer, C will not be equal to B although this is the theoretical ideal situation.

As the outer diameter E of the bearing depends of the application, the radial extent of the outer planar portion may vary. Usually a small planar region is required for pressing the bearing into the bearing retainer of the motor but it is not essential.

The abutment 18 of the rotor may be an axial end face of a spacer or collar fitted to the shaft to limit axial movement of the shaft. Alternatively, it may be a thrust washer fitted to the shaft and axially supported by a step created by a spacer or collar fitted to the shaft or by a change in diameter of the rotor shaft. The thrust washer helps to reduce friction and wear between the bearing and the step.

Figure 4:
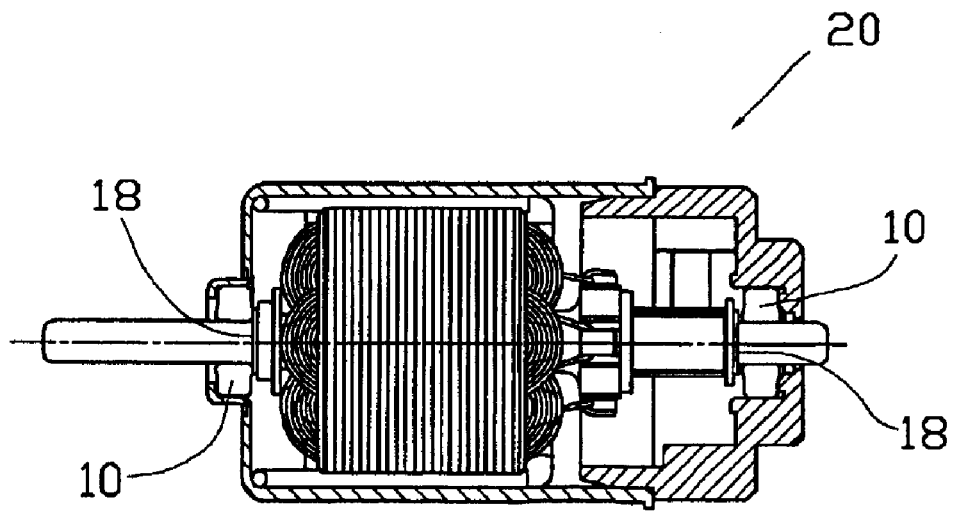
FIG. 4 is a part sectional view of a miniature electric motor incorporating the bearing of FIG. 1

Thus the present invention provides a motor 20 as shown in FIG. 4 with a bearing of the oil impregnated sintered bushing type which has reduced friction in a thrust interface with the rotor when the thrust interface is misaligned.

Although one preferred embodiment has been described as one example of how to put the invention into practice, various modifications will be apparent to those skilled in the art without departing from the scope of the invention as defined in the following claims. For example, the thrust surface is shown as being part conical but it could be curved, rounded or smoothly joining the inner and outer edges of the thrust surface with the remainder of the axial face of the bearing and maybe the inner and/or outer edges of the thrust surface are not well defined.

What is claimed is:

1. A miniature electric motor having:

a stator;

a rotor having a shaft and an abutment with an outer diameter A; and an oil impregnated sintered bearing fixed with respect to the stator and supporting the rotor, the bearing having a cylindrical outer surface, a central bore defining an inner surface with a diameter B, and first and second end faces, the first end face having a thrust surface co-operating with the abutment to form a thrust interface between the rotor and the stator;

wherein the thrust surface is axially inclined having an inner edge with a diameter C, an outer edge with a diameter D and an axial separation H between the inner and outer edges, and wherein $C<A<D$ and $B \leq C \leq 1.5B$.

2. The motor of claim 1, wherein $1.1B \leq C \leq 1.3B$.

3. A miniature electric motor having:

a stator;

a rotor having a shaft and an abutment with an outer diameter A; and an oil impregnated sintered bearing fixed with respect to the stator and supporting the rotor, the bearing having a cylindrical outer surface, a central bore defining an inner surface with a diameter B, and first and second end faces, the first end face having a thrust surface co-operating with the abutment to form a thrust interface between the rotor and the stator;

wherein the thrust surface is axially inclined having an inner edge with a diameter C, an outer edge with a diameter D and an axial separation H between the inner and outer edges, and wherein $C<A<D$ and $B \leq C \leq 1.5B$; and wherein the first end face has an annular planar surface extending from the outer edge of the thrust surface to the periphery of the bearing.

4. A miniature electric motor having:

a stator;

a rotor having a shaft and an abutment with an outer diameter A; and an oil impregnated sintered bearing fixed with respect to the stator and supporting the rotor, the bearing having a cylindrical outer surface, a central bore defining an inner surface with a diameter B, and first and second end faces, the first end face having a thrust surface co-operating with the abutment to form a thrust interface between the rotor and the stator;

wherein the thrust surface is axially inclined having an inner edge with a diameter C, an outer edge with a diameter D and an axial separation H between the inner and outer edges, and wherein $C<A<D$ and $B \leq C \leq 1.5B$; and wherein the first end face has an annular planar surface extending from the inner edge of the thrust surface towards the central bore.

5. The motor of claim 1, wherein an axial end of the bore through the bearing is chamfered forming a mouth and the thrust surface extends from the mouth.

6. The motor of claim 1, wherein the axial separation H is between 0.1 mm to 0.5 mm.

7. The motor of claim 1, wherein the thrust surface is axially inclined at an angle X where $85° \leq X \leq 89.5°$.

8. The motor of claim 1, wherein the second end face is substantially identical to the first end face of the bearing.

9. The motor of claim 1, wherein the abutment of the rotor is an axial end face of a spacer fitted to the shaft.

10. The motor of claim 1, wherein the abutment is a low friction washer fitted to the shaft and axially supported by a step of the rotor.

11. The motor of claim 1, wherein the thrust surface is substantially a rounded frustum.

12. The motor of claim 1, wherein the first end face is smoothly contoured.

* * * * *